United States Patent [19]

Vetter et al.

[11] Patent Number: 5,650,107
[45] Date of Patent: Jul. 22, 1997

[54] METHOD FOR DEWATERING A MOLTEN SYNTHETIC RESIN

[75] Inventors: Heinz Vetter, Rossdorf; Hartmut Schikowsky, Darmstadt, both of Germany

[73] Assignee: Röhm GmbH, Darmstadt, Germany

[21] Appl. No.: 439,847

[22] Filed: May 12, 1995

[30] Foreign Application Priority Data

May 19, 1994 [DE] Germany .................... 44 17 559.0

[51] Int. Cl.$^6$ .............. B29B 7/48; B29B 7/84; B29C 47/60; B29C 47/76
[52] U.S. Cl. ............ 264/102; 264/211.23; 366/85
[58] Field of Search .............. 264/85, 102, 211.23, 264/349; 366/75, 77, 85, 89

[56] References Cited

U.S. PATENT DOCUMENTS

| | | | |
|---|---|---|---|
| 4,110,843 | 8/1978 | Skidmore | 366/89 X |
| 4,446,094 | 5/1984 | Rossiter | 264/349 |
| 5,232,649 | 8/1993 | Anderson et al. | 264/211.23 |

FOREIGN PATENT DOCUMENTS

| | | |
|---|---|---|
| 2601380 | 1/1988 | France. |
| 1186770 | 4/1970 | United Kingdom. |

OTHER PUBLICATIONS

Abstract of Japan 4–311,703 (Published Nov. 4, 1992).

*Primary Examiner*—Leo B. Tentoni

[57] ABSTRACT

A two phase liquid mixture of a thermoplastic synthetic resin melt and an aqueous phase, such as a latex coagulate, is dewatered in a counter-rotating twin screw extruder under a pressure which is greater that the water vapor pressure at the temperature of the melt of the thermoplastic synthetic resin by conveying the melt into partially filled screw channels in the dewatering zone and restricting it in at least one of these screw channels in the entry nip of the twin screws to create a local, narrowly limited, steep pressure gradient and to form a coherent melt cake, and draining the water in liquid form from beneath under gravity upstream from the boundary of the melt cake so that the melt cake does not stand in contact with a coherent aqueous phase.

9 Claims, 4 Drawing Sheets

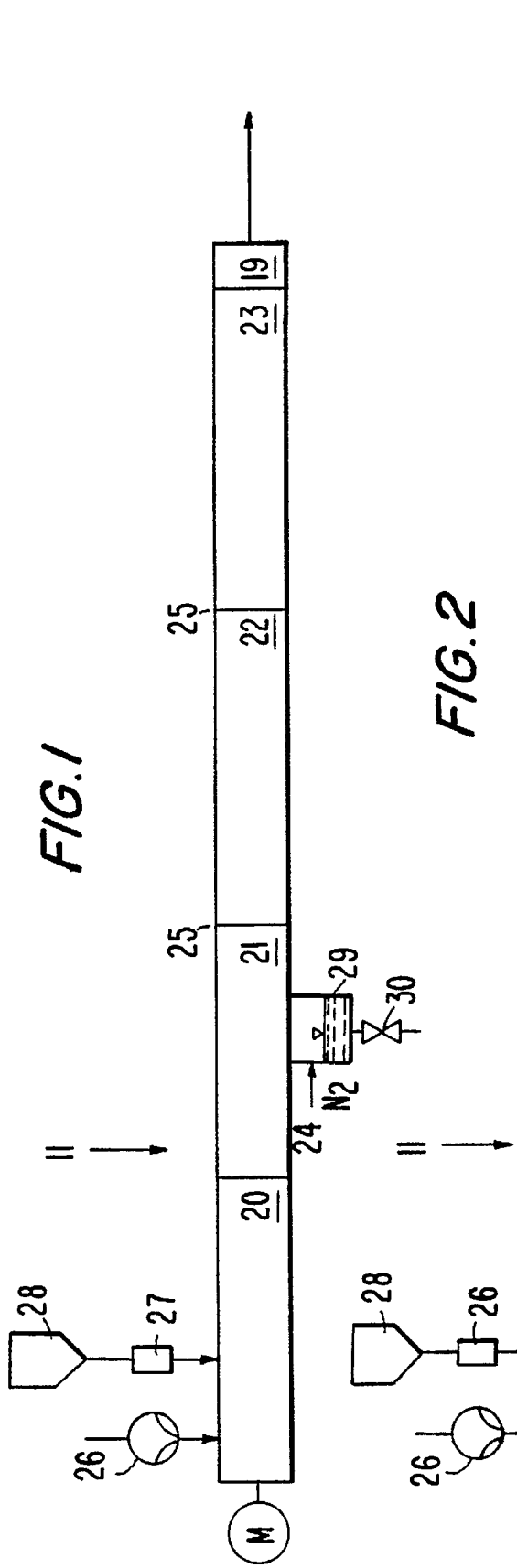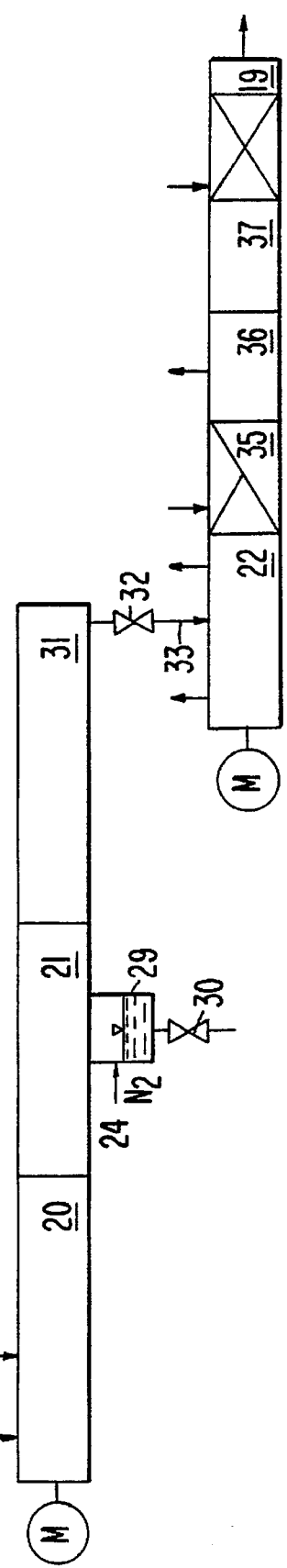

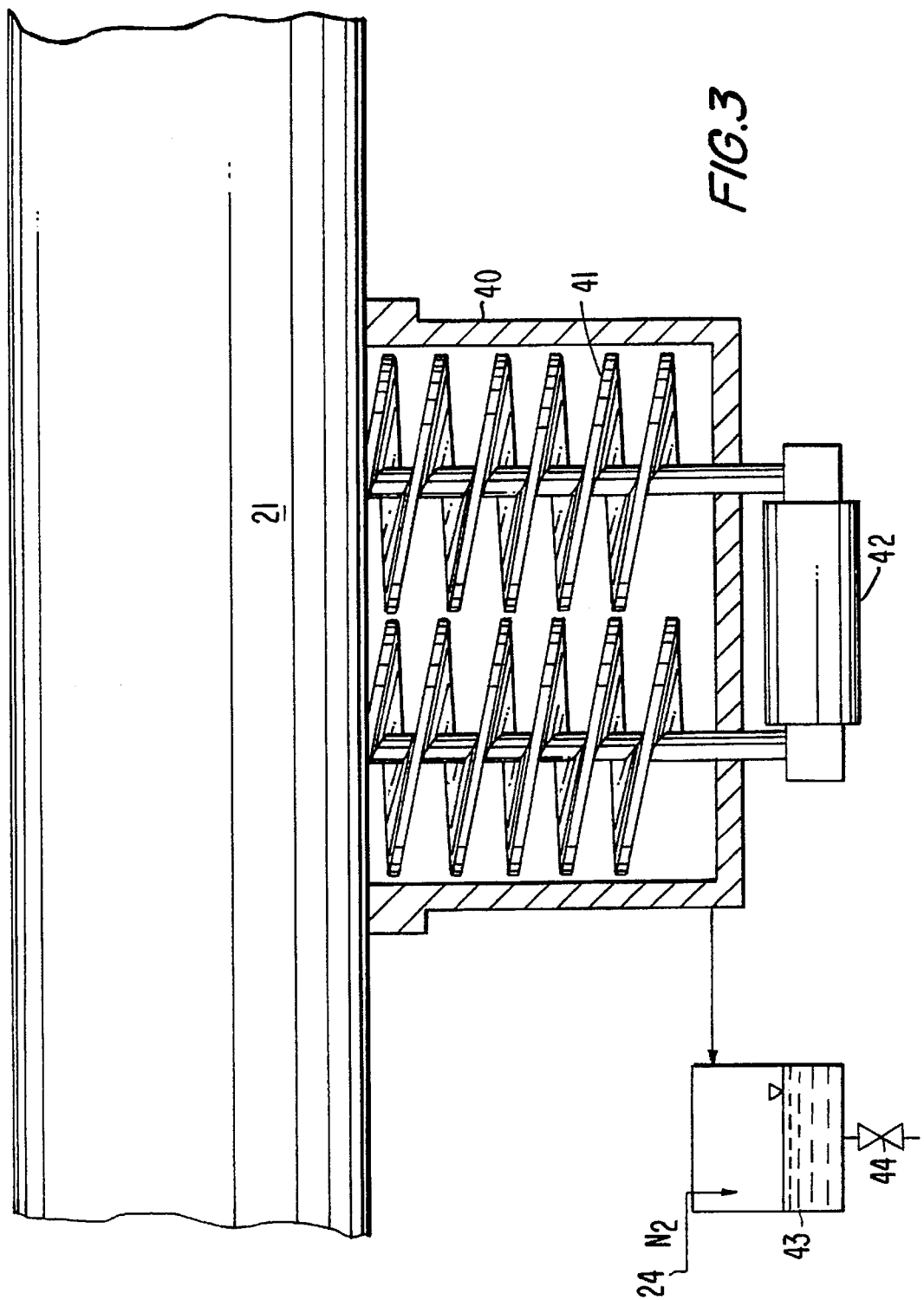

METHOD FOR DEWATERING A MOLTEN SYNTHETIC RESIN

BACKGROUND OF THE INVENTION

1. Brief Description of the Invention

The invention relates to a method for dewatering a two-phase liquid mixture of a thermoplastic resin melt and an aqueous phase in a counter-rotating twin screw extruder and withdrawing the aqueous phase from the extruder in liquid form. As a rule, the method is part of a method for dewatering a latex of a thermoplastic resin in a counter-rotating twin screw extruder.

In the dispersion employed, the synthetic resin is in the form of latex particles uniformly distributed in the continuous aqueous phase. The primary particles of the latex coagulate under the influence of shear forces in the extruder at a temperature in the thermoplastic region of the resin and form a molten phase which is mixed with the aqueous phase. In the screw extruder, a phase separation occurs due to a pressure gradient. The pressure gradient is caused by the construction characteristics of the extruder, e.g. decreasing screw pitch in the direction of transport or decreasing available cross-sectional area because of increasing core diameter or decreasing cylinder- and screw-diameter or by a restriction zone having kneading or mixing elements located after a section of the screw. The pressure gradient causes a back flow in which the aqueous phase, because of its lower viscosity, reaches a greater flow velocity than does the melt phase. Thus, there is a preferred back flow of the aqueous phase. The phase separation is caused by this effect: the melt phase accumulates in the zone of highest pressure while the aqueous phase flows back more strongly in the zone of least pressure. However, phase separation is hindered if the back flowing water collects as a continuous aqueous phase because it is then repeatedly mixed back into the resin melt by the action of the screws.

2. Description of the Art

It has long been known to obtain a melt of a synthetic resin by coagulation and dewatering of a resin latex in an extruder and optionally to mix the resin at the same time with a different thermoplastic resin. According to DE-A 20 37 784, dewatering takes place in three stages with decreasing pressure of the vapor phase. According to DE-A 22 43 696, coagulation is carried out under a pressure at which the separated water remains liquid. The resin melt is conveyed downstream from the mixture of resin melt and the separated aqueous phase with the build up of a pressure gradient and the water found in the resin is pressed out and transported backwards. A portion of the mixture of melt and water penetrates into an outlet for water removal located on the side of the extruder, from which the melt portion is transported back by means of a screw conveyor while the aqueous phase exits through a valve which maintains the pressure The separation of the aqueous phase in liquid form before evaporation of the entire aqueous phase has the advantage that dissolved components, such as coagulating agents or emulsifiers, are removed at the same time and that the expenditure of energy for evaporation of the water and for pumping off large volumes of steam are saved.

According to U.S. Pat. No. 4,136,251, a twin screw extruder having a tightly sealed chamber is used. The mixture of melt and water is transported through a narrow region in a decompression zone of the extruder, from which the water emerges at moderate pressure through an overhead port equipped with a vent screw. The remaining melt is passed into a further pressure zone for complete dewatering and conveyed from there into a degassing zone. U.S. Pat. No. 4,148,991 teaches a method variant in which a synthetic resin latex alone is dewatered, without an added melt of a thermoplastic synthetic resin.

It is common to all the described methods that the mixture of resin melt and the separated aqueous phase is transported into a pressure zone which extends over the length of several screw channels from which the water is more strongly pressed with increasing pressure and is transported backwards. The screw channels are filled with this melt-water mixture, in which the water portion decreases in the direction of increasing pressure. The longer such a pressure zone is, the more water is constantly pressed back into the molten phase so that complete dewatering is attained only with difficulty.

The removal of water through a lateral channel equipped with a conveyor screw must take place in a region in which the water forms the continuous phase and the melt is the phase distributed therein. If the lateral channel is too close to the site at which the latex enters, considerable amounts of the as-yet uncoagulated latex resin are lost with the water which has been expressed. Thus, the water is removed in a zone which is located as far as possible downstream. However, the phase reversal boundary, where the melt-in-water mixture converts to a water-in-melt mixture, is not in a fixed location because of the instability of the transport effect during continuous operation. If it retreats to the starting point of the dewatering channel, melt presses in strongly and can sometimes not be held back by conveyor screws, or only with difficulty. The operation of a dewatering extruder thus demands continuous careful monitoring and must often be interrupted for obviating disturbances despite careful attention.

SUMMARY OF THE INVENTION

The invention has as its object the avoidance or reduction of problems of the kind described in a method for dewatering a two phase liquid mixture of a thermoplastic synthetic resin melt and an aqueous phase, particularly a latex coagulate, in a counter-rotating twin screw extruder. By increased efficacy of dewatering, throughput is to be increased and the amount of water to be removed as a vapor phase is to be reduced.

Just as in the known dewatering methods, the method of the invention is performed under a pressure which is greater than the water vapor pressure at the temperature of the thermoplastic resin melt. The aqueous phase is drawn off from the dewatering zone in liquid form. In the dewatering zone, the melt is subdivided into several fractions which are respectively fed into screw flight channels which are separate from one another. According to the invention, the melt phase is restricted in at least one of these screw flight channels at the intake nip of the twin screw extruder, with formation of local, narrowly limited, pressure gradients, to give a coherent melt cake. In this way, water is drained off under the influence of gravity through at least one bottom-located drainage outlet before the boundary of the melt cake so that the melt cake does not stand in contact with a coherent aqueous phase.

BRIEF DESCRIPTION OF THE DRAWINGS

FIG. 1 is a schematic side view, in section, showing the division of a twin screw extruder into different zones;

FIG. 2 is a schematic side view, in section, showing another arrangement having separate dewatering and degassing extruders;

FIG. 3 is a schematic side view, in section, showing a preferred configuration of an arrangement for removing water from a dewatering extruder;

Figure 4:
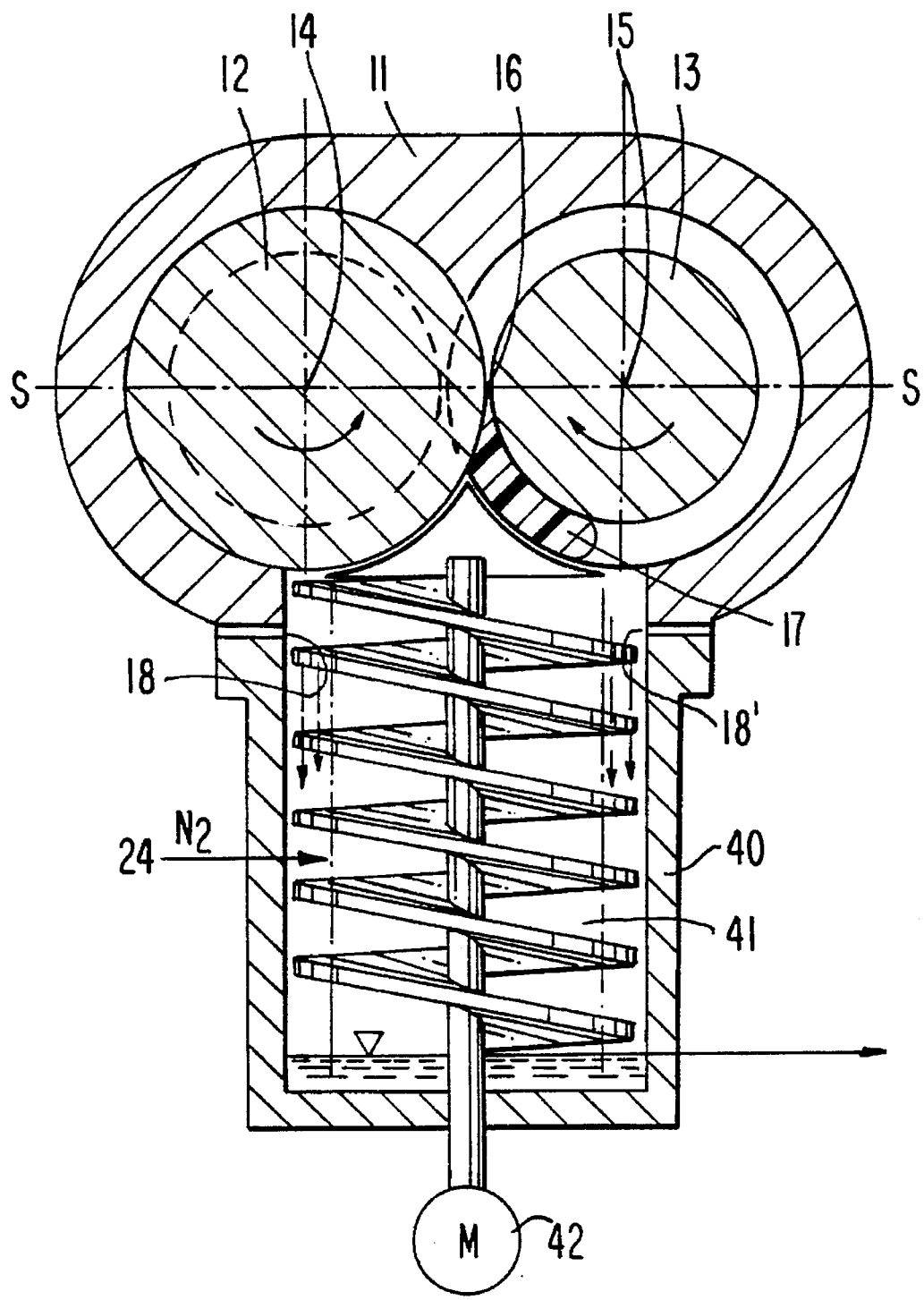
FIG. 4 is an end view, in section, through the embodiment of FIG. 3.
Figure 5:
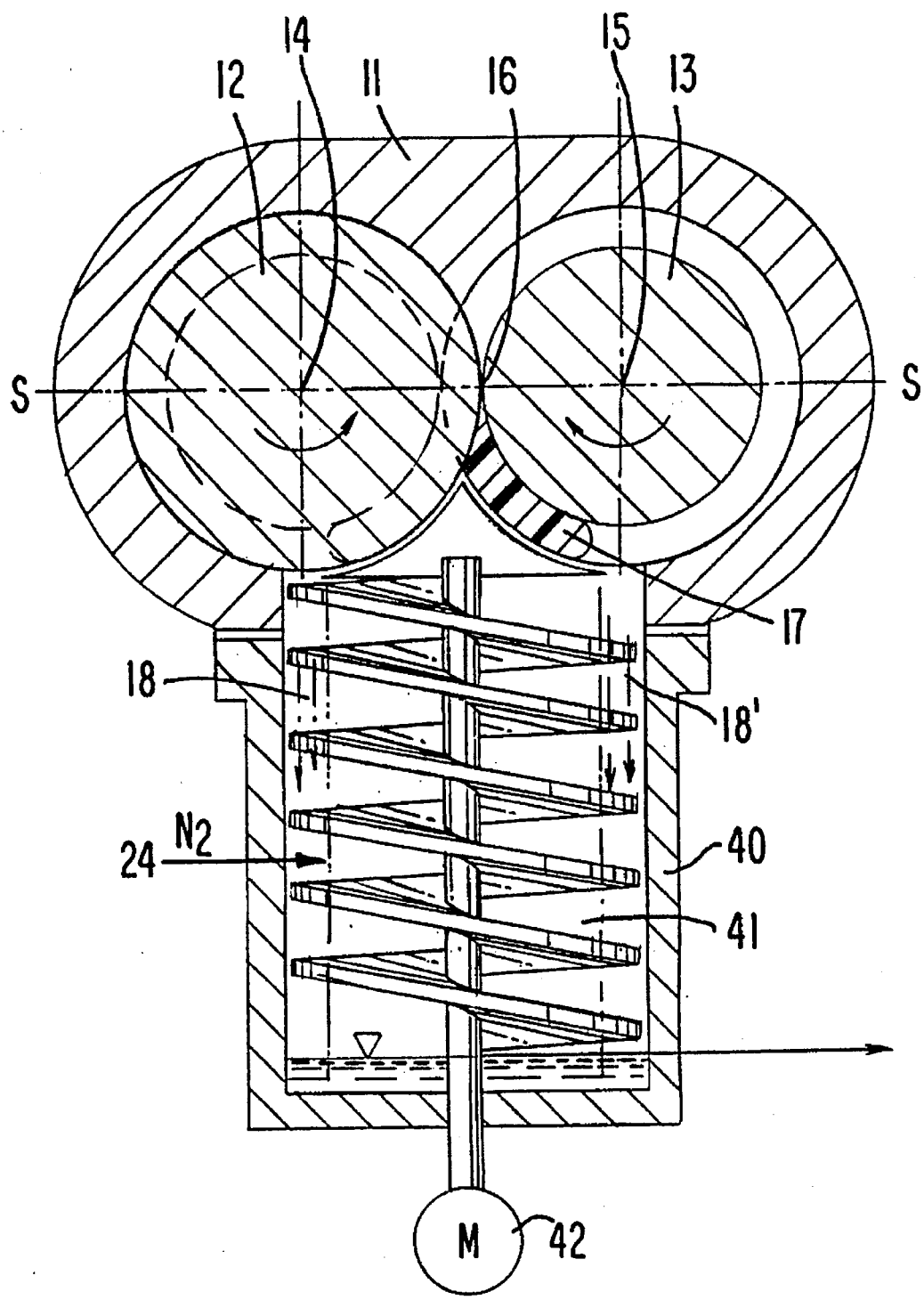

Particularly referring to FIG. 4 of the drawings, in contrast to known dewatering methods the melt in the present invention is not restricted in front of a resistance zone of the screws, but in every individual screw channel of the dewatering zone. In this way, the pressure gradient is limited to a small space and is considerably steeper than in a conventional pressure zone extending over several screw threads. Because of the tightly meshing arrangement of the twin screws, entry of the melt into nip 16 between the screws is negligible, so that in each screw channel dense melt cake 17 accumulates in the wedge before the nip and is transported farther linearly with the rotation of the screws. Under the influence of the local narrowly limited pressure gradients, an intensive dewatering occurs in the partially filled screw channels. It is important that the expressed water can run off at once and not constantly be milled back into a melt cake from a coherent aqueous phase located at the boundary of the melt cake. The melt cake is, rather, predominately in contact with a vapor or gas phase.

The expressed aqueous phase can then best be removed if screw axes (14, 15) are arranged in a horizontal plane S—S and counterrotate so that melt cake 17 is dammed below this plane S—S and the water is run off through drainage outlet 18 at the lowest point of the extruder casing. The filling of the screw channels must then be so limited that the melt cake does not extend to the lowest point of the extruder casing because it then could close the drain opening found there. During reversed direction of rotation, the melt cake accumulates above the level of touching. Thus, it can be necessary to form a larger melt cake to permit water draining in the direction of gravity. In this case, the dewatering effect can be somewhat smaller because of back mixing.

Only at the end of the dewatering zone is the melt, from which now water no longer emerges, led into a restriction zone where the screw channels fill with melt and a seal between the dewatering zone and the reduced pressure of the following degassing zone is formed.

DETAILED DESCRIPTION

The method of the invention adapts itself to the dewatering of latices. These as a rule contain from 30 to 50 percent by weight of dispersed synthetic resin particles, the average particle size of which can be, for example, from 100 nanometers (nm) to 500 nm. The aqueous phase correspondingly makes up 70 to 50 percent by weight. In general it contains dissolved emulsifiers, optional coagulating agents, or other auxiliaries and foreign substances. The latex particles consist of thermoplastic synthetic resins which can be worked in an extruder in a molten condition. To these belong thermoplastic synthetic resins having glass transition temperatures from 50° C. to 300° C., or a temperature region in which they are in a molten condition and in which they are resistant to decomposition. The melt temperature in a twin screw extruder as a rule is between 100° C. and 250° C.

Important classes of thermoplastic synthetic resins are copolymers comprising butadiene, styrene, and optionally acrylonitrile, as well as polyvinyl chloride, polyacrylates or polymethacrylates. A further important class are latices of multiphase thermoplastic synthetic resins containing latex particles having a thermoplastic hard phase and a crosslinked tough phase. Optionally these can be mixed during the method with a further thermoplastic synthetic resin which is introduced into the twin screw extruder in solid or molten form and which is the same as the resin of the hard phase of the latex or is compatible with it. Preferably, the resin of the hard phase consists predominately of polymethyl methacrylate and the resin of the tough phase consists predominately of crosslinked polybutyl acrylate which can also be copolymerized with styrene or benzyl acrylate to adapt its optical index of refraction to that of the polymethyl methacrylate. Typical mixtures of this sort contain, for example, 4 to 50 percent by weight of the multiphase latex synthetic resin, in which the fraction of polybutyl acrylate can be 2 to 80 percent by weight and the polymethyl methacrylate fraction can be 20 to 98 percent by weight together with 2 to 60 percent by weight of thermoplastic polymethyl methacrylate resin. If the latter is not introduced in molten form, it is also possible to mix the latex of the multiphase synthetic resin with a polymethyl methacrylate latex and to work up the mixture of latices according to the method of the invention.

The dewatered resin is removed from the twin screw extruder in the form of a melt. This can occur with the aid of a granulating nozzle 19 from which a plurality of thin strands extrude, are cooled beneath the softening temperature, and are broken into a commercial molding compound granulate. However, a shaped synthetic resin body, for example a film, can also be extruded directly in known fashion with an appropriate extrusion nozzle.

OPERATION OF THE METHOD

Twin screw extruder 11 used in the invention contains screws 12, 13 arranged in parallel and interlocking in comb-like fashion so that the flights of one screw extend into the screw channels of the other screw. In the medial plane S—S, in which the axes 14, 15 of both screws lie, the two screws extend close to one another for their entire length and form a seal at screw nip 16 through which practically no melt penetrates. Because of this, one speaks of "closely intermeshing twin screw extruders". The screw channels are separated spatially from one another by screw nip 16. Melt cake 17 present in every individual screw channel is perforce transported forward at each turn of the screw flight without significant mixing with the amounts of melt in neighboring channels. The closely meshed twin screw extruder thus has a high conveying efficiency which counteracts fluctuation of the phase boundaries.

Different zones can be differentiated in the extruder according to their function. In each zone the screw geometry is adapted to the respective function. Referring to FIGS. 1 and 2, as a rule are distinguished:

coagulation zone 20 where the latex, an optional coagulating agent, and an optional additional thermoplastic resin are introduced and coagulated and where phase separation is induced at an operating pressure above the water vapor pressure by shearing elements such as kneading, mixing, and restriction zones;

dewatering zone 21 from which liquid water is removed;

degassing zone 22 which is separated from the dewatering zone by a pressure-tight restriction zone 25;

pump zone 23 for regeneration of pressure and for removal of the melt.

For purposes of production, the twin screw extruder can have a screw diameter of 55 millimeters (mm) to 300 mm and a length 30 to 50 times the screw diameter.

The operating conditions can be so set that the phase boundary of melt cake 17 in each screw channel lies close to drainage outlet 18, 18', i.e. closely behind it in the direction of rotation. The aqueous phase can in this way be removed unhindered. Suitably, drainage outlet 18 is located at the lowest point beneath the median plane S—S—which preferably lies horizontally—so that the water can flow into drainage outlet 18 under the influence of gravity. The optimum degree of filling of the screw channels in the dewatering zone can be exactly set by coordinating the amount of synthetic resin introduced in the form of latex and optional resin melt with the transport and discharge capacity of the extruder.

Separation of the synthetic resin from the latex is not part of the claimed method: as a rule this occurs beforehand. It leads first to a liquid coagulate with melt particles or droplets dispersed therein. Under the shearing forces in coagulation zone 20 of the extruder, the melt droplets originally formed increasingly combine with each other to a continually growing melt agglomeration suspended in the aqueous phase. By multiple alternations of transport, kneading, and storage zones, the process can be accelerated. This mixture of a melt phase and an aqueous phase is the starting point for the method of the invention.

The dewatering method is suitable for extended operation under steady conditions. The latex or a conveyable liquid pre-coagulate prepared therefrom is introduced into one or more locations in extruder 11 using suitable dosing device 26, e.g. a diaphragm pump. If the latex or pre-coagulate is worked alone, it or they can be introduced at the rear end. If, however, a mixture with a further thermoplastic synthetic resin is prepared, the latter can be added from storage container 28 as a granulate using dosing device 27, melted, and made plastic. Preferably the resin is introduced already as a melt. In dewatering zone 21, the resin separated from the latex or pre-coagulate mixes with the melt already present.

Phase separation is performed at a pressure sufficiently high that the aqueous phase does not vaporize, even at the lowest pressure in the region of the pressure gradient. At melt temperatures of 100° C. to 240° C., a pressure from 10 bar to 40 bar is necessary in the dewatering zone. The operating pressure can optionally be adjusted by inert gas pumped in; for example, nitrogen having a pressure above the vapor pressure of the aqueous phase can be introduced under pressure through line 24.

In dewatering zone 21, the separated aqueous phase is led, with maintenance of the pressure, through at least one drainage outlet 18 in the extruder wall into dewatering receptacle 29 to expansion valve 30. Before entry into the dewatering zone, the melt can be cooled by forcing cold water into it under pressure to increase its viscosity. In this way the tendency of the melt to flow together with the water into the drainage outlet can be reduced. Preferably drainage outlet 18 is in the lower casing so that the separated aqueous phase exits from the twin screw extruder under gravity.

On the way to expansion valve 30 the aqueous phase can be cooled so that it does not boil when depressurized. As drainage outlet 18, a slit running parallel to the screw axis and having a breadth of about 0.01 to 0.1 D and a length of 1 to 3 D, where D is the screw diameter, is suitable. Cylindrical exit channel 40 having auxiliary screw 41 can also be used, which screw by means of drive 42 conveys back into the twin screw channel any melt which might penetrate thereinto if normal operation is disturbed. As shown in FIG. 3, located at the exterior end of the auxiliary screw is collection vessel 43, kept under pressure, from which the separated aqueous phase emerges through pressure valve 44. Suitably, line 24 for inert gas is connected to collection vessel 43.

After withdrawal of the aqueous phase, the resin melt contains at most only 5 to 20 percent by weight of water in dissolved form or included as a liquid. The separation of water soluble components, such as emulsifiers or electrolytes, from the melt can be completed if the dewatered melt is combined in a supplemental mixing zone with pure water or another liquid solvent which dissolves the impurities but not the resin and the mixture is then again separated in a further dewatering zone in the same way as before. The residual water or solvent is then extensively evaporated in subsequent degassing zone 22 at normal pressure and/or at a pressure of 0.01 bar to 0.99 bar, optionally in several stages at decreasing pressures. A water content below 0.1 percent by weight, preferably from 0.03 to 0.06 percent by weight is striven for. After degassing, the melt is brought into final pump zone 23 under a melt pressure suitable for extrusion and is extruded.

During the phase separation, the necessary amount and uniformity of the pressure can be maintained steady if dewatering zone 21 is in apparatus separate from degassing zone 22. The functions of phase separation and degassing are in this case divided between two extruders, wherein an intermeshing twin screw extruder is necessary only for the first function. The pressure at the end of dewatering zone 21, which can be joined to pump zone 31 can be set exactly for the extruded melt by means of choke valve 32. The melt is led though line 33 to a conventional degassing extruder. There, after degassing zone 22, a further resin melt, as well as other optional additives such as lubricants, stabilizers, antistatic agents, colorants, UV-absorbers, and the like can be fed into one or more mixing zones 35, then the last volatile fractions can be removed from the melt under vacuum in further degassing zone 36. At the end of the degassing extruder, the melt is removed through pump zone 37.

EXAMPLE

Dewatering of a Polyacrylate Latex

An emulsion polymer prepared in three states and having the following composition is treated: the weight ratios of the monomer components are given in parentheses.

| Stage I | MMA/EA/ALMA | (95.7/4/0.3) |
|---|---|---|
| Stage II | BA/S/ALMA | (82/17/1) |
| Stage III | MMA/EA | (96/4) |
| Weight ratio I/II/III | | 20/45/35 |

Weight ratio polymer phase/aqueous phase: 45/55.
MMA = methyl methacrylate
EA = ethyl acrylate
ALMA = allyl methacrylate
BA = butyl acrylate
S = styrene The latex is pumped into the cylinder of a tightly meshed counter-rotating twin screw extruder 11 with a diaphragm dosing pump 26 having a mass flow of 10 kg/h. The screw axes 14, 15 lie in a horizontal plane S—S; the direction of rotation runs beneath the plane S—S to screw nip 16. The screw diameters are 34 mm. Screws 12, 13 are triple flighted with a pitch of 30 mm.

Coagulation zone 20 of FIG. 2 has a length of 600 mm and is kept at 230° C.; dewatering zone 21 has a length of 120 mm and is operated at a cylinder temperature of 210° C. The rotation of the screws is set to 80 rpm so that the phase boundary between melt cake 17 and aqueous phase comes to lie at an angle of 45° beneath the medial plane, measured from the screw slit.

In the dewatering zone, the two cylinders are opened at their lowest point with slits 2 mm wide and 60 mm in length. Collection container 29 is mounted beneath both these openings to be pressure-tight.

Collection container 29 for the separated water is kept under a nitrogen pressure of 40 bar through line 24. An amount of water of 5.27 kg/h is removed through valve 30 using a liquid level control. The water contains 0.4 percent by weight of organic substance. The flow into the adjacent degassing extruder is so controlled by valve 32 that a melt pressure of 80 bar is constantly maintained in front of the valve. The outflow into the degassing extruder contains 8 percent by weight of water.

In the degassing extruder (screw diameter 34 mm), the residual amounts of volatile fractions are separated using a forward- and rearward- degassing zone. The pressure in the rear zone is 600 millibar (mbar); in the following forward zone it is 30 mbar. The extrudate or granulate taken off at granulating nozzle 19 has a residual moisture of 0.06 percent by weight. It is used as an agent for modifying the impact strength of PMMA-molding compounds.

What is claimed is:

1. A method for dewatering a two phase liquid mixture of a thermoplastic synthetic resin melt and an aqueous phase, which method comprises transporting the mixture into a dewatering zone of a counterrotating extruder having closely intermeshing twin screws and partially filling screw channels of the twin screws under a pressure which is greater than the vapor pressure of water at the temperature of the melt;

restricting the melt in the entry nip of at least one screw channel, whereby melt accumulates within said screw channel creating a local narrowly-limited steep pressure gradient within the screw channel and a coherent melt cake having a phase boundary is formed in said channel;

and draining off liquid water by gravity from beneath the screw channels through at least one drainage outlet beneath the phase boundary of the melt cake, so that the melt cake does not stand in contact with a coherent aqueous phase.

2. A method as in claim 1 wherein the screw axes of the twin screw extruder lie in a horizontal plane and counterrotate to restrict the melt cake beneath this plane, and wherein water is drained off through a drainage outlet at the lowest point of the extruder.

3. A method as in claim 1 wherein the water drained off is collected in a vessel at a level beneath the extruder.

4. A method as in claim 1 wherein the liquid mixture to be dewatered is formed at least in part by coagulation of a latex of a thermoplastic synthetic resin in a coagulation zone in the extruder upstream of the dewatering zone.

5. A method as in claim 1 wherein the mixture to be dewatered is formed at least in part from a melt of a thermoplastic synthetic resin.

6. A method as in claim 1 wherein the liquid mixture to be dewatered is formed by combining a melt of a thermoplastic resin and a latex of a thermoplastic synthetic resin in a mixing zone upstream of the dewatering zone.

7. A method as in claim 6 wherein one or more of (a) the amount of melt introduced, (b) the amount of latex introduced, and (c) the transport capacity of the extruder is controlled such that the melt cake formed in the screw channels does not cover the drainage outlet.

8. A method as in claim 1 wherein the mixture is dewatered under an inert gas.

9. A method as in claim 1 wherein, after removal of water from the liquid mixture in the dewatering zone, the thermoplastic synthetic resin is vacuum degassed to remove residual water.

* * * * *